United States Patent
Shiotani et al.

(10) Patent No.: US 8,278,371 B2
(45) Date of Patent: Oct. 2, 2012

(54) NON-AQUEOUS INK JET INK COMPOSITION

(75) Inventors: Toshihiko Shiotani, Otawara (JP); Takehiro Kotera, Otawara (JP); Kazuki Moriyama, Otawara (JP); Emiko Osaka, Otawara (JP); Hiroki Hayashi, Otawara (JP); Tetsuo Sugawa, Otawara (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 401 days.

(21) Appl. No.: 12/532,729

(22) PCT Filed: Jan. 31, 2008

(86) PCT No.: PCT/JP2008/051509
§ 371 (c)(1),
(2), (4) Date: Sep. 23, 2009

(87) PCT Pub. No.: WO2008/120490
PCT Pub. Date: Oct. 9, 2008

(65) Prior Publication Data
US 2010/0056679 A1 Mar. 4, 2010

(30) Foreign Application Priority Data
Mar. 29, 2007 (JP) .................................. 2007-087700

(51) Int. Cl.
C04B 24/22 (2006.01)
C08G 67/02 (2006.01)
C09D 5/00 (2006.01)
C09D 11/00 (2006.01)

(52) U.S. Cl. ......... 523/160; 523/161; 524/247; 524/612

(58) Field of Classification Search .................. 523/160, 523/161; 524/247, 612
See application file for complete search history.

(56) References Cited

U.S. PATENT DOCUMENTS
7,125,447 B2 * 10/2006 Sugita et al. ............... 106/31.58
2005/0176848 A1 * 8/2005 Chen et al. .................... 523/160

FOREIGN PATENT DOCUMENTS
| JP | 57-094063 A | 6/1982 |
| JP | 60-152575 A | 8/1985 |
| JP | 2001-214113 A | 8/2001 |
| JP | 2006-056990 A | 3/2006 |
| JP | 2007-009126 A | 1/2007 |
| WO | WO 02/46322 | * 6/2002 |

* cited by examiner

Primary Examiner — Patrick Niland
(74) Attorney, Agent, or Firm — Frommer Lawrence & Haug LLP; Ronald R. Santucci

(57) ABSTRACT

A nonaqueous inkjet ink composition that at printing by an inkjet printer, is free from clogging of a nozzle of printer head part and that excels in ink delivery stability leading to prints of excellent printing quality. The nonaqueous inkjet ink composition is one containing a pigment, a resin, a pigment dispersant, an organic solvent and an aminated alcohol, characterized in that the content of the aminated alcohol is in the range of 0.01 to 3 mass % based on the whole mass. The nonaqueous inkjet ink composition may be one characterized in that the water extract from the nonaqueous inkjet ink composition exhibits a pH value ranging from 6.0 to 10.0.

6 Claims, No Drawings

NON-AQUEOUS INK JET INK COMPOSITION

This application is a 371 of PCT/JP2008/051509 filed on Jan. 31, 2008, published on Oct. 9, 2008 under publication number WO 2008/120490 A which claims priority benefits from Japanese Patent Application No. 2007-087700 filed Mar. 29, 2007, the disclosure of which is hereby incorporated by reference.

TECHNICAL FIELD

The present invention relates to a non-aqueous ink jet ink composition. More particularly, it relates to a non-aqueous ink jet ink composition which does not cause clogging in a nozzle of the printer head part for printing by an ink jet printer, and is excellent in discharge stability of the ink, capable of providing a printed matter excellent in print quality.

BACKGROUND ART

Conventionally, a large number of pigment ink compositions for ink jet printing using various solvents have been proposed. However, when a printed matter is made by means of an ink jet printer using such a pigment ink composition, clogging may be caused in the nozzle of the ink jet printer, resulting in a printed matter not desirable in terms of print quality. Further, even when a printed matter is made using such a pigment ink composition, color development is not necessarily sufficient.

For example, for an aqueous ink, a study has been conducted on an ink jet recording ink excellent in discharge stability and containing 2,2-dibuyl-1,3-propanediol (see, Patent Literature 1).

Whereas, for solvent type pigment inks, a study has been conducted on an ink composition for ink jet printing containing at least one of glycol ethers and at least one of a lactone compound and 2-pyrrolidone in a solvent. (see, Patent Literature 2)

{Citation List}
 {Patent Literature}
 {PTL 1} JP-A No. 2007-009126
 {PTL 2} JP-A No. 2006-056990

SUMMARY OF INVENTION

Technical Problems

The present invention has been made in order to solve the foregoing problems. It is an object of the invention to provide a non-aqueous ink jet ink composition which does not cause clogging in a nozzle of the printer head part for printing by an ink jet printer, and is excellent in discharge stability of the ink, capable of providing a printed matter excellent in print quality.

Solution to Problems

The present inventors conducted a close study in order to achieve the foregoing objects. As a result, they found that, by allowing the ink composition to contain an amino group-containing alcohol therein, it is possible to obtain a non-aqueous ink jet ink composition excellent in discharge stability, leading to the completion of the invention.

Namely, a non-aqueous ink jet ink composition according to the present invention is a non-aqueous ink jet ink composition which contains a pigment, a resin, a pigment dispersant, an organic solvent, and an amino group-containing alcohol, characterized in that the content of the amino group-containing alcohol is 0.01 to 3 mass % based on the total amount.

Advantageous Effects of Invention

Use of a non-aqueous ink jet ink composition according to the present invention prevents the occurrence of clogging in a nozzle of a printer head part for printing by an ink jet printer, and can provide a printed matter excellent in print quality.

DESCRIPTION OF EMBODIMENTS

Below, a non-aqueous ink jet ink composition according to the present invention will be specifically described.

In the non-aqueous ink jet ink composition according to the present invention, it is necessary to use an amino group-containing alcohol together with a pigment, a resin, a pigment dispersant, and an organic solvent.

Below, a description will be given to respective components of the non-aqueous ink jet ink composition according to the present invention.

As the pigments for use in the non-aqueous ink jet ink composition according to the present invention, mention may be made of Pigment Yellows 12, 13, 14, 17, 20, 24, 31, 55, 74, 83, 86, 93, 109, 110, 117, 120, 125, 128, 129, 137, 138, 139, 147, 148, 150, 151, 153 (nitron type nickel complex yellow), 154, 155, 166, 168, 180, 181, and 185, Pigment Oranges 16, 36, 38, 43, 51, 55, 59, 61, 64, 65, and 71, Pigment Reds 9, 48, 49, 52, 53, 57, 97, 122 (Quinacridone Mazenta), 123, 149, 168, 177, 180, 192, 202, 206, 215, 216, 217, 220, 223, 224, 226, 227, 228, 238, 240, 244, and 254, Pigment Violets 19 (Quinacridone Violet), 23, 29, 30, 32, 37, 40, and 50, Pigment Blues 5, 15:1, 15:3, 15:4, 15:6, 22, 30, 64, and 80, Pigment Greens 7 (chlorinated phthalocyanine green), and 36 (brominated phthalocyanine green), Pigment Browns 23, 25, and 26, Pigment Blacks 7 (Carbon Black), 26, 27, and 28, titanium oxide, iron oxide, ultramarine blue, chrome yellow, zinc sulfide, cobalt blue, barium sulfate, calcium carbonate, and the like. The amount of the pigment to be added can be arbitrarily determined according to the kind of the pigment used, and the like. However, it is generally 0.1 to 15 mass %, and preferably 0.5 to 10 mass %. When the amount is less than 0.1 mass %, the tinting power of the ink is reduced. When the amount exceeds 15 mass %, nozzle clogging tends to occur.

The non-aqueous ink jet printing ink composition according to the present invention contains a resin as a binder as with a general ink composition. Such resins may be resins for a binder commonly used in general ink compositions, and have no particular restriction. As such resins, polyester resins, acrylic resins, vinyl chloride resins, and the like can be preferably used.

As the polyester resins, both of saturated polyester and unsaturated polyester resins may be used. The polyester resin can be obtained by a condensation reaction between a polybasic acid and a polyhydric alcohol. Examples of the polybasic acid for use in the polyester resin may include: aromatic dicarboxylic acids such as phthalic acid, isophthalic acid, terephthalic acid, 1,5-naphthalenedicarboxylic acid, 2,6-naphthalenedicarboxylic acid, 9,10-anthracene dicarboxylic acid, and diphenic acid; aromatic oxycarboxylic acids such as p-oxy benzoic acid, and p-(hydroxyethoxy)benzoic acid; aliphatic dicarboxylic acids such as succinic acid, adipic acid, azelaic acid, sebacic acid, and dodecane dicarboxylic acid; aliphatic unsaturated polyvalent carboxylic acids such as fumaric acid, maleic acid, itaconic acid, mesaconic acid, cyclohexene dicarboxylic acid, dimer acid, trimer acid, and tetramer acid; alicyclic dicarboxylic acids such as hexahydrophthalic acid, and tetrahydrophthalic acid; and polyvalent carboxylic acids such as trimellitic acid, trimesic acid, and pyromellitic acid. Alternatively, for a part of polybasic acids, a monobasic acid may be used. Examples of monobasic acids may include benzoic acid, chlorobenzoic acid, bromobenzoic acid, parahydroxybenzoic acid, t-butyl benzoic acid, naphthalene carboxylic acid, 3-methyl benzoic acid, 4-methyl benzoic acid, salicylic acid, thiosalicylic acid, phenyl acetic acid, naphthalene carboxylic acid, anthracene carboxylic acid, t-butyl naphthalene carboxylic acid, and cyclohexyl aminocarbonyl benzoic acid.

Examples of polyhydric alcohols for use in polyester resins may include aliphatic polyhydric alcohols including aliphatic diols such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, and polytetramethylene glycol, triols and tetraols such as trimethylol ethane, trimethylolpropane, glycerin, and pentaerythritol; alicyclic polyhydric alcohols such as 1,4-cyclohexanediol, 1,4-cyclohexanedimethanol, spiro glycol, bisphenol A, hydrogenated bisphenol A, tricyclodecane diol, and tricyclodecane dimethanol; and aromatic polyhydric alcohols such as paraxylene glycol, metaxylene glycol, orthoxylene glycol, and 1,4-phenylene glycol. Further, for a part of polyhydric alcohols, a monohydric alcohol may be used in combination.

The number-average molecular weight of a polyester resin for use in the present invention falls preferably within the range of 1000 to 50000, and further preferably within the range of 2000 to 20000. When the number-average molecular weight of a polyester resin is smaller than 1000, the ethanol resistance evaluation of the ink printed film is inferior. In the case of more than 50000, an ink drawing phenomenon tends to occur, which may unfavorably result in unstable ink dischargeability, or other problems. Thus, both the cases are not preferable.

As the acrylic resins, there can be used those obtained by copolymerizing commonly used radical polymerizable monomers. Examples of the radical polymerizable monomers may include acrylic acid esters such as methyl acrylate, ethyl acrylate, isopropyl acrylate, n-butyl acrylate, and 2-ethylhexyl acrylate; methacrylic acid esters such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; aromatic vinyls such as styrene, vinyl toluene, and "-methyl styrene; vinyl esters such as vinyl acetate and vinyl propionate; heterocyclic vinyl compounds such as vinyl pyrrolidone; vinyl halides such as vinyl chloride, vinylidene chloride, and vinylidene fluoride; vinyl ethers such as ethyl vinyl ether and isobutyl vinyl ether; and "-olefins such as ethylene and propylene.

Alternatively, there can also be used polymerizable monomers containing a functional group such as an acid or a base. Examples of the functional group-containing monomers may include: carboxyl group-containing monomers such as acrylic acid, methacrylic acid, maleic acid, fumaric acid, itaconic acid, mono n-butyl maleate, mono n-butyl fumarate, mono n-butyl itaconate, and crotonic acid; hydroxyl group-containing (meth)acrylic acid esters such as 2-hydroxyethyl (meth)acrylate, 2-hydroxypropyl(meth)acrylate, 3-hydroxypropyl(meth)acrylate, 4-hydroxybutyl(meth)acrylate, (2-hydroxymethyl)ethyl acrylate, (2-hydroxymethyl)butyl acrylate, (4-hydroxymethyl cyclohexyl)methyl(meth)acrylate, glycerin mono(meth)acrylate, 2-(meth)acryloyloxyethyl 2-hydroxypropyl phthalate, and 2-hydroxy-3-phenoxypropyl(meth)acrylate; amide group-containing monomers such as acrylamide, methacrylamide, maleic acid amide, and diacetone acrylamide; glycidyl group-containing monomers such as glycidyl methacrylate and allyl glycidyl ether; cyano group-containing monomers such as acrylonitrile and methacrylonitrile; dienes such as butadiene and isoprene; hydroxyl group-containing allyl compounds such as allyl alcohol and 2-hydroxyethyl allyl ether; tertiary amino group-containing monomers such as dimethylamino ethyl methacrylate and diethylamino ethyl methacrylate; and alkoxysilyl group-containing monomers such as vinyl trimethoxysilane, vinyl triethoxysilane, vinyl triisopropoxysilane, vinyl tris(β-methoxyethoxy)silane, vinyl methyldimethoxysilane, vinyl methyldiethoxysilane, vinyl dimethylmethoxysilane, vinyl dimethylethoxysilane, 3-methacryloxypropyl trimethoxysilane, 3-methacryloxypropyl triethoxysilane, 3-methacryloxypropylmethyl dimethoxysilane, and 3-methacryloxypropylmethyl diethoxysilane. Alternatively, there can also be used monomers having two or more unsaturated bonds per molecule, such as diallyl phthalate, divinylbenzene, allyl acrylate, and trimethylolpropane trimethacrylate. These monomers may be used alone, or may also be used in combination of two or more thereof.

As vinyl chloride resins, various ones are usable. Examples thereof may include copolymerized resins of vinyl chloride and other monomers such as vinyl acetate, vinylidene chloride, acrylic, and maleic acid. A preferred vinyl chloride resin is a vinyl chloride/vinyl acetate copolymerized resin obtained by copolymerizing vinyl chloride and vinyl acetate. Particularly preferably, mention may be made of a copolymerized resin with a molecular weight of 30,000 or less.

Other resins than those described above have no particular restriction, and any of resins for use in general ink compositions can be used. Examples thereof may include: amino resins such as epoxy resin, phenol resin, novolak resin, rosin-modified phenol resin, melamine, and benzoguanamine, polyamide resin, cellulose ester resins such as cellulose diacetate, cellulose triacetate, nitro cellulose, cellulose nitrate, cellulose propionate, and cellulose acetate butyrate, and cellulose ether resins such as methyl cellulose, ethyl cellulose, benzyl cellulose, trityl cellulose, cyan ethyl cellulose, carboxymethyl cellulose, carboxyethyl cellulose, and amino ethyl cellulose.

The foregoing resins may be used in combination. However, in order to improve the adhesion with the base material upon printing, it is preferable that the non-aqueous ink jet ink composition of the present invention contains any of a polyester resin, an acrylic resin, and a vinyl chloride resin as a resin.

The content of the resin for use in the non-aqueous ink jet ink composition according to the present invention is preferably 1 to 20 mass %, and further, more preferably 1 to 10 mass %. When the content of the resin is less than 1 mass %, the adhesion with the base material is unfavorably insufficient. When the content is more than 20 mass %, the viscosity of the ink composition increases, which unfavorably results in instable dischargeability, and the like. Thus, both the cases are not preferable.

The non-aqueous ink jet ink composition according to the present invention uses a pigment dispersant in order to improve the dispersibility of the pigment.

As the pigment dispersants, there can be used polyamide type resins, hydroxyl group-containing carboxylic acid esters, a salt of a long-chain polyamino amide with a high-molecular weight acid ester, salts of high-molecular weight polycarboxylic acid, a salt of a long-chain polyamino amide with a polar acid ester, high-molecular weight unsaturated acid esters, modified polyurethane, modified polyacrylate, polyether ester type anionic activator, naphthalenesulfonic acid formalin condensate salts, aromatic sulfonic acid formalin condensate salts, polyoxyethylene alkylphosphoric acid esters, polyoxyethylene nonylphenyl ether, stearyl amine acetate, and the like.

In the non-aqueous ink jet ink composition according to the present invention, as a pigment dispersant, a polyester polyamide resin having two or more amide groups per molecule, and having a number-average molecular weight of 700 to 15000 is preferably used. The amount of the pigment dispersant to be added varies according to the kind of the pigment used, or the like. However, it is generally preferably 0.1 to 15 mass %, and further preferably 0.5 to 10 mass % in the ink composition for more improving the pigment dispersibility.

The polyester polyamide resin is produced by allowing an acid-terminated polyester resin and a polyamine compound having two or more amino groups per molecule to react with each other. Examples thereof may include Solsperse 32000, Solsperse 32500, Solsperse 32600, Solsperse 33500, Solsperse 34750, Solsperse 35100, Solsperse 37500, and the like, manufactured by Lubrisol Corp, and BYK9077, and the like manufactured by BYK-Chemie Japan KK.

Incidentally, when the number of the amide groups per molecule of the polyester polyamide resin is less than 2, the resin is not preferable in terms of pigment dispersibility. Whereas, when the number-average molecular weight is less than 700, the pigment dispersibility is reduced. When the number-average molecular weight exceeds 15000, the dispersibility in the ink is reduced. Thus, both the cases are not preferable.

The non-aqueous ink jet ink composition according to the present invention uses an organic solvent for use in general solvent type ink.

As the organic solvents, mention may be made of alcohols such as methyl alcohol, ethyl alcohol, n-propyl alcohol, isopropyl alcohol, n-butyl alcohol, tridecyl alcohol, cyclohexyl alcohol, and 2-methylcyclohexyl alcohol; glycols such as ethylene glycol, diethylene glycol, triethylene glycol, polyethylene glycol, propylene glycol, dipropylene glycol, and glycerin; glycol ethers such as ethylene glycol monomethyl ether, ethylene glycol monoethyl ether, ethylene glycol monobutyl ether, ethylene glycol diethyl ether, ethylene glycol dimethyl ether, diethylene glycol monomethyl ether, diethylene glycol monoethyl ether, diethylene glycol monobutyl ether, diethylene glycol ethyl methyl ether, diethylene glycol dimethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, ethylene glycol monomethyl acetate, ethylene glycol monoethyl acetate, ethylene glycol monobutyl acetate, diethylene glycol monomethyl acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl acetate, diethylene glycol monobutyl acetate, and triethylene glycol monobutyl ether; esters such as ethyl acetate, isopropylene acetate, n-butyl acetate, methyl lactate, ethyl lactate, and butyl lactate; ketones such as acetone, methyl ethyl ketone, methyl isobutyl ketone, cyclohexanone, isophorone, and diacetone alcohol; and other than these, toluene, xylene, acetonitrile, γ-butyrolactone, γ-valerolactone, and the like. From these, various solvents are selected from the viewpoints of the adaptability to the characteristics of the head nozzle for printing, the safety, and the drying property. If required, the plurality of solvents may be used in a mixture thereof.

The non-aqueous ink jet ink composition according to the present invention preferably contains glycol ethers as organic solvents. Out of these, diethylene glycol ethyl methyl ether, diethylene glycol diethyl ether, diethylene glycol dibutyl ether, dipropylene glycol monomethyl ether, dipropylene glycol dimethyl ether, propylene glycol monomethyl ether acetate, diethylene glycol monoethyl ether acetate, and diethylene glycol monobutyl ether acetate are preferable because of their excellent printing characteristics.

The non-aqueous ink jet ink composition according to the present invention contains an amino group-containing alcohol, and thereby does not cause clogging in a nozzle of the printer head part for printing by an ink jet printer, resulting in a printed matter excellent in print quality.

As the amino group-containing alcohols, mention may be made of 2-amino-1-butanol, 2-amino-2-methyl-1-propanol, 2-amino-2-methyl-1,3-propanediol, 2-amino-2-ethyl-1,3-propanediol, tris(hydroxymethyl)amino methane, and the like. However, particularly, 2-amino-2-ethyl-1,3-propanediol or 2-amino-2-methyl-1,3-propanediol is excellent because of its excellent printing characteristics.

As the amino group-containing alcohols, the plurality of compounds may be used. The ink composition is required to contain therein the compounds in an amount of 0.01 to 3 mass %, and further preferably contains the compounds in an amount of 0.1 to 2 mass %.

When the content of the amino group-containing alcohol is less than 0.01 mass %, clogging in a nozzle tends to occur. When the content exceeds 3 mass %, a problem of thickening of the ink occurs due to pigment aggregation. Thus, both the cases are not preferable.

The content of the amino group-containing alcohol is preferably 0.01 to 5 mass %, and further preferably 0.1 to 2 mass % per 100 mass % of the organic solvent. When the content is less than 0.01 mass % per 100 mass % of the organic solvent, clogging into the nozzle and corrosion of the head part tend to occur. When the content exceeds 5 mass %, thickening of the ink due to pigment aggregation, and inferior ethanol resistance evaluation of the ink printed film unfavorably occur. Thus, both the cases are not preferable.

For a water extract of the non-aqueous ink jet ink composition according to the present invention, the pH is preferably 6.0 to 10.0 in order that clogging in a nozzle for printing will not occur, and that a printed matter with excellent printing quality can be obtained. When the pH of the water extract is smaller than 6.0, corrosion of the printer head part tends to occur. When the pH is more than 10.0, thickening of the ink due to pigment aggregation unfavorably occurs. Thus, both the cases are not preferable. The pH of the water extract is further preferably 6.5 to 8.5.

For the water extract of the ink composition, the ink composition is added in an amount of 1 g per 100 g of distilled water, and is well stirred. After standing for a while, the water extract thereof is measured by means of a pH meter.

Further, the pH of the water extract of the ink composition can be adjusted to a pH of 6.0 to 10.0 by delicately controlling the amount of the amino group-containing alcohol to be added to the ink composition.

The non-aqueous ink jet ink composition according to the present invention basically contains a pigment, a resin, a pigment dispersant, an organic solvent, and an amino group-containing alcohol. However, according to the intended uses or the like, additives such as a dye, a surface conditioner, an UV absorber, a light stabilizer, an antioxidant, and a plasticizer may be used in combination.

The non-aqueous ink jet ink composition according to the present invention can be used for various ink jet printers. Examples of such ink jet printer may include systems of ejecting an ink composition by a charge control process and an ink on demand process.

The non-aqueous ink jet ink composition according to the present invention can also be preferably used printing by means of large size ink jet printer using a large format, for example, for printing of an ink jet printer for the purpose of printing on an outdoor article such as sign display. Further, also in color graphic printing or drawing of video recorded images, the contrast is clear, and the reproduction of an image is remarkably favorable.

The printed side (ink composition) after ink jet printing is dried at ordinary temperatures to several hundreds of degrees centigrade, resulting in formation of a dry film. Incidentally, the base material targeted for printing in the present invention has no particular restriction so long as it will not be deformed or modified in nature under the conditions for drying the printed side (ink composition). Examples of such a base material may include the base material surfaces of a metal, glass, plastic, and the like, paper coated with a resin on the surface, plastic sheet and film, and outdoor articles such as sign displays.

EXAMPLES

Below, the present invention will be described in further details by way of Examples and Comparative Examples. Incidentally, below, "part(s)" and "%" are both based on the mass.

Examples 1 to 5 and Comparative Examples 1 to 5

Mixtures containing the components in the mixing amounts (parts by mass) shown in Table 1 were respectively kneaded for 3 hours by means of a sand mill, thereby to prepare ink compositions of Examples 1 to 5, and Comparative Examples 1 to 5.

As for the used pigments, carbon black was Monarch 1000 (manufactured by Cabot Corporation); quinacridone magenta pigment, FASTOGEN Super Magenta RG (manufactured by Dai Nippon Ink and Chemicals, Inc.); phthalocyanine blue, Irgalite Blue 8700 (manufactured by Ciba Speciality Chemicals); and nickel complex pigment, E4GN-GT (manufactured by LANXESS K.K.). As for the resins, polyester resin was VYLON GK810 (manufactured by TOYOBO Co., Ltd., number-average molecular weight=6000, glass transition point Tg=46° C., acid value=5 mgKOH/g, hydroxyl value=19 mgKOH/g); acrylic resin, DYANAL MB2660 (manufactured by MITSUBISHI RAYON CO., LTD., weight-average molecular weight=65000, Tg=52° C., acid value=3 mgKOH/g); and the vinyl chloride resin, SOLBIN CL (manufactured by Nissin Chemical Industry Co., Ltd., vinyl chloride-vinyl acetate copolymer, number-average molecular weight=25000, Tg=70° C.). For the pigment dispersant, the polyester polyamide resin A was Solsperse 32000 (manufactured by Lubrisol Corp, solid content concentration 100%, and number-average molecular weight=1500), and the polyester polyamide resin B was BYK9077 (manufactured by BYK-Chemie Japan KK., solid content concentration 99%, and number-average molecular weight=1400).

For the resulting respective ink compositions of Examples 1 to 5 and Comparative Examples 1 to 5, the viscosity, particle size, pH of the water extract, nozzle discharge stability, dispersion stability and ethanol resistance were respectively measured with the following methods, and were evaluated based on the following criteria.

<Viscosity Measurement>

The viscosity of each ink composition was measured at 20° C. by means of a B type viscometer for the ink composition immediately after preparation.

<Particle Diameter Measurement>

For the particle size of each ink composition, the mean particle diameter (D50) was measured for the ink composition immediately after preparation by means of a laser diffraction type grain size distribution measuring device ("SALD-7000" manufactured by SHIMADZU CORPORATION).

<pH of Water Extract>

The pH of the water extract of each ink composition was measured at 20° C. by means of a pH meter by adding dropwise 1 g of the ink composition to 100 g of distilled water by using a separating funnel, and well mixing/stirring the mixture, and allowing the mixture to stand for a while, and then extracting the water extract (lower layer part).

<Dispersion Stability>

Each ink composition was stored at 60° C. for 1 month in a closed container, and then, was taken out therefrom. The viscosity and the particle diameter thereof were measured in the foregoing manner. Respective changes between before 1-month storage and after 1-month storage were evaluated based on the following criteria.

⊚: Changes in viscosity and particle diameter are both within ±5%;

○: At least one of changes in viscosity and particle diameter is more than ±5% and within ±10%; and X: At least one of changes in viscosity and particle diameter is more than ±10%.

<Nozzle Discharge Stability>

Images were printed for eight consecutive hours by means of an ink jet printer for large format. Thereafter, printing was stopped for 1 week under environment of a temperature of 40° C. and a humidity of 65%, and printing was performed for one consecutive hour again. The print state was visually evaluated based on the following criteria.

○: Out of printed dots, 80% or more thereof can be properly printed at prescribed positions; and Δ: Out of printed dots, more than 20% and less than 80% thereof undergo skew of the dots.

X: Out of printed dots, 80% or more thereof undergo skew of the dots.

<Ethanol Resistance>

By means of an ink jet printer for large format, an image was printed on a white vinyl chloride sheet, and was dried. Then, the printed image surface was rubbed with a cloth impregnated with a 50 mass % aqueous ethanol, and the surface conditions were visually evaluated.

⊚: No change at all;

○: Ink is partially peeled, and print becomes light; and

X: Ink is peeled, and the base is visible.

The measurement results and the evaluation results are as shown in Table 1.

[Table 1]

As apparent from data shown in Table 1, the ink compositions of Examples 1 to 5 of the present invention provide favorable evaluation results for respective test items, and provide inks favorable for printing.

On the other hand, the ink compositions of Comparative Examples 1 to 4 using an amino group-containing alcohol outside the scope of the present invention cause nozzle clogging, and result in inferior printing. Further, the ink of Comparative Example 5 using an amino group-containing alcohol also cause nozzle clogging, and leads to defective printing.

TABLE 1

| | Ink composition | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Pigment | Carbon black | 4 | 4 | | | | 4 | 4 | | | |
| | Quinacridone magenta | | | 3 | | | | | 3 | | |
| | Phthalocyanine blue | | | | 4 | | | | | 4 | |
| | Nickel complex pigment | | | | | 3 | | | | | 3 |
| Resin | Polyester resin | 8 | | | 8 | 8 | 8 | | | 8 | 8 |
| | Acrylic resin | | 8 | | | | | 8 | | | |
| | Vinyl chloride resin | | | 8 | | | | | 8 | | |
| Organic solvent | Diethylene glycol ethyl methyl ether | 50 | 80 | 76 | 65 | 35 | 50 | 76 | 77 | 65 | 36 |
| | Diethylene glycol diethyl ether | 34 | | | 20 | 50 | 30 | | | 21 | 50 |
| | Dipropylene glycol monomethyl ether | | 5 | 5 | | | | 5 | 5 | | |
| | γ-butyrolactone | 1 | | | | 1 | 1 | | | | 1 |
| | Isophorone | | | 5 | | | | | 5 | | |
| Amino group-containing alcohol | 2-amino-2-ethyl-1,3-propanediol | 1 | | 1 | | 1 | 5 | | 0.005 | | |
| | 2-amino-2-methyl-1,3-propanediol | | 1 | | | | | 5 | | | |
| | 2-amino-2-methyl-1-propanol | | | | 1 | | | | | 0.001 | |
| Pigment dispersant | Polyester polyamide resin A | 2 | | 2 | 2 | 2 | 2 | | 2 | 2 | 2 |
| | Polyester polyamide resin B | | 2 | | | | | 2 | | | |
| Ink property | viscosity (mPa·s, 20° C.) | 4.6 | 4.5 | 4.7 | 4.8 | 4.4 | 4.9 | 4.8 | 4.7 | 4.8 | 4.4 |
| | Particle diameter D50 (nm) | 85 | 90 | 125 | 145 | 110 | 85 | 90 | 125 | 145 | 110 |
| | pH of water extract (20° C.) | 7.1 | 7.5 | 7.1 | 6.9 | 7.7 | 10.9 | 10.5 | 4.9 | 3.9 | 5.3 |
| | Nozzle discharge stability | ○ | ○ | ○ | ○ | ○ | X | X | X | X | X |
| | Dispersion stability | ⊚ | ⊚ | ○ | ○ | ⊚ | X | X | ○ | ○ | ⊚ |
| | Ethanol resistance | ⊚ | ⊚ | ⊚ | ⊚ | ⊚ | X | X | ⊚ | ⊚ | ⊚ |

The invention claimed is:

1. A non-aqueous ink jet ink composition comprising a pigment, a resin, a pigment dispersant, an organic solvent, and an amino group-containing alcohol, wherein
the content of the amino group-containing alcohol is 0.01 to 3 mass % based on the total amount,
the amino group-containing alcohol is 2-amino-2-ethyl-1,3-propanediol or 2-amino-2-methyl-1,3-propanediol.

2. The non-aqueous ink jet ink composition according to claim 1, wherein
the pH of a water extract of the non-aqueous ink jet ink composition according to claim 1 is 6.0 to 10.0.

3. The non-aqueous ink jet ink composition according to claim 1, wherein the organic solvent contains glycol ethers.

4. The non-aqueous ink jet ink composition according to claim 1, wherein the content of the amino group-containing alcohol is 0.01 to 5 mass % per 100 mass % of the organic solvent.

5. The non-aqueous ink jet ink composition according to claim 1, wherein the pigment dispersant is a polyester polyamide resin having two or more amide groups per molecule, and having a number-average molecular weight of 700 to 15000.

6. The non-aqueous ink jet ink composition according to claim 1, wherein the resin contains any of a polyester resin, an acrylic resin, and a vinyl chloride resin.

* * * * *